United States Patent Office 3,250,814
Patented May 10, 1966

1

3,250,814
PRODUCTION OF UNSATURATED ETHERS
Robert James Stephenson, Llanyravon, Cwmbran, England, assignor to Monsanto Chemicals Limited, London, England, a British company
No Drawing. Filed Nov. 1, 1961, Ser. No. 149,219
Claims priority, application Great Britain, Nov. 14, 1960, 39,012/60
4 Claims. (Cl. 260—615)

This invention relates to an improved process for the production of ethers, and in particular to the production of allyl ethers.

Ether containing allyl groups are useful industrial products, owing to the reactivity of the allyl groups. Apart from general applications as chemical intermediates, allyl ethers are of particular interest as monomers which can be polymerised either alone or with other ethylenically unsaturated compounds.

In copending application S.N. 123,132, filed July 11, 1961, there is described a process for the production of an allyl ether, in which an allyl alcohol is reacted with itself or with an aliphatic alcohol in the presence as catalyst of a cuprous salt and an acid co-catalyst. The purpose of the present invention is to provide an alternate, and in certain instances a more expedient, route to certain of these allyl ethers. Other objects of this invention will in part be obvious and will in part appear hereinafter.

These and other objects are obtained by contacting a diallyl ether with an aliphatic alcohol in the presence as catalyst of a cuprous salt and an acid co-catalyst.

The following examples are presented in illustration of the invention and are not intended as limitations thereof.

Example I

This example describes the preparation of allyl n-butyl ether from diallyl ether and n-butanol.

A mixture of 75 grams (ca. 0.75 mol.) of diallyl ether, 75 grams (ca. 1.0 mol.) of n-butanol, 5.0 grams (ca. 20 milliequivalents) of Zeocarb SRC/225/16 (a sulphonated polystyrene cross-linked with 8% by weight of divinylbenzene) and 1 gram (ca. 0.01 mol.) of cuprous chloride is stirred and heated under reflux in a flask fitted with a water separating still-head. After 3 hours, about 10 grams of water has been separated and the reaction is terminated by cooling and decanting the liquid from the particles of resin. Fractional distillation of the product at atmospheric pressure gives a fore-fraction consisting essentially of unreacted diallyl ether, and about 86 grams (77% yield on n-butanol) of allyl n-butyl ether.

Example II

This example describes the preparation of allyl 2-butoxyethyl ether from diallyl ether and 2-butoxyethanol.

A mixture of 75 grams (ca. 0.75 mol.) of diallyl ether, 120 grams (ca. 1.0 mol.) of 2-butoxyethanol, 90 grams of benzene, 4.5 grams (ca. 20 milliequivalents) of Zeocarb SRC/225/12 (a sulphonated polystyrene cross-linked with 4½% by weight of divinylbenzene) and 0.5 gram (ca. 0.005 mol.) of cuprous chloride is heated under reflux in equipment similar to that described in Example I. After 3 hours, the reaction is terminated. After decanting from the catalyst, benzene and excess diallyl ether are removed from the liquid reaction product by distillation at atmospheric pressure. Distillation of the residue at a pressure of about 31 mm. of mercury gives about 142 grams (ca. 90% of the theoretical yield) of allyl 2-butoxyethyl ether, having a boiling point of 82–85° C.

Example III

This example describes the preparation of allyl 2-chloroethyl ether from diallyl ether and ethylene chlorohydrin.

This preparation is carried out in a similar manner to that of Example II but with the 2-butoxyethanol of that example replaced by 80 grams (ca. 1.0 mol.) of ethylene chlorohydrin. By fractional distillation of the product at atmospheric pressure there are obtained about 98 grams (82% of the theoretical yield) of allyl 2-chloroethyl ether having a boiling point of 130–135° C.

Example IV

This example describes the preparation of a mono-allyl ether of polyethylene glycol wherein said ether contains a plurality of free hydroxyl groups.

This preparation is carried out in a similar manner to that of Example I but with the n-butanol of that example replaced by 150 grams (ca. 0.75 mol) of a polyethylene glycol having an average molecular weight of about 200. Fractional distillation of the product yields a fraction consisting essentially of mono-allyl ether of polyethylene glycol.

Example V

Example I is repeated employing equivalent proportions of hydrochloric acid and cuprous sulfate in place of the Zeocarb SRC/225/16 and cuprous chloride, respectively. The product is allyl n-butyl ether.

The process of this invention can be represented by the equation:

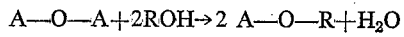

wherein A represents an allyl group and R represents an aliphatic radical. In practice, both allyl groups in the diallyl ether A—O—A will usually be the same, although asymmetric diallyl ethers can be used.

Diallyl ether itself is a particularly useful starting material, but in general each allyl group can be one having the formula:

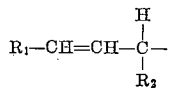

wherein $R_1$ is a hydrogen atom, a hydrocarbon group or a substituted hydrocarbon group and $R_2$ is a hydrogen atom or an alkyl group, or wherein $R_1$ and $R_2$, together with the —CH=CH—CH— radical, form an alicyclic ring; preferably, when $R_1$ is a hydrogen atom, $R_2$ is also a hydrogen atom.

In those embodiments wherein the $R_1$ substituent of the diallyl ether is a hydrocarbon group it can, for example, be an aliphatic group with either a straight or branched chain, and can be fully saturated or have one or more multiple carbon-carbon bonds. Thus $R_1$ can, for example, be an alkyl group such as methyl, ethyl, propyl, butyl, amyl, hexyl, octyl or a higher alkyl group, or an alkenyl group such as a vinyl, propenyl, isobutenyl or a 1,3-pentadienyl group. Alternatively $R_1$ can be a cyclic group, for example, a cyclopentyl, cyclohexyl, alkylcyclohexyl or a cyclohexenyl group, an aralkyl group such as a benzyl or a beta-phenethyl group, or an aryl group such as a phenyl, tolyl, or xylyl group. Typical examples of diallyl ethers of this embodiment include, for example, dicrotyl ether, bis-(pent-2-enyl)ether, bis-(3-cyclohexylallyl)ether, bis(3-benzylallyl)ether, bis(hept-2-enyl)ether, bis-(3-isooctylallyl)ether, bis(3-paravinyl allyl)ether, etc.

In those embodiments wherein the $R_1$ substituent of the diallyl ether is a substituted hydrocarbon group the substituent will generally be one which remains inert during the process; for example, an alkoxy or ketonic group such as is present for instance in a p-ethoxyphenyl, 4-methoxybutyl, or acetonyl group. However, suitable substituent groups which do not remain inert are exemplified principally by the alcoholic hydroxyl group, and precursors which are converted to an alcoholic hydroxyl group under the conditions of the reaction. $R_1$ can then be a group such as a hydroxymethyl, bromomethyl, beta-hydroxy ethyl or alpha-hydroxypropenyl group, and in such cases the main product can, under appropriate conditions, be a polyether. Typical examples of diallyl ethers of this embodiment include, for example, bis-(para-ethoxycinnamyl) ether, bis-(4-chlorobut-2-enyl)ether, bis-(4-methoxybut-2-enyl)ether, bis-(4-hydroxybut-2-enyl)ether, bis-(3-alpha-hydroxypropenyl-prop-2-enyl)ether, etc.

In those embodiments wherein the $R_2$ substituent of the diallyl ether is an alkyl group, it is preferably a lower alkyl group; that is, one containing not more than four carbon atoms as, for example, a methyl, ethyl, n- or isopropyl or n- or s-butyl group. Typical examples of diallyl ethers of this embodiment include, for example, bis-(1-methyl-but-2-enyl) ether, bis-(1-methyl-3-paravinylallyl)ether, bis-(1-isopropyl-4-chloro-but-2-enyl)ether, etc.

In those embodiments wherein the $R_1$ and $R_2$ substituents of the diallyl ether are joined to form an alicyclic ring, this will in general be a 5-, 6-, or 7-membered ring, in which case the allyl group will be an appropriate cyclopentenyl, cyclohexenyl or a cycloheptenyl group. Typical examples of diallyl ethers of this embodiment include, for example, dicyclohex-2-enyl ether, dicyclopent-2-enyl ether, dicyclohept-2-enyl ether, etc.

The aliphatic alcohol with which the diallyl ether is reacted can be chosen from a wide range including mono- and poly-hydric alcohols having, for example, up to 30 carbon atoms. A polyhydric alcohol is generally one having from 2 to 6 hydroxyl groups. Preferably, the aliphatic alcohol is primary or secondary.

Thus, the alcohol can be, for example, an aliphatic alcohol having a straight, branched or cyclic chain, preferably of up to 20 carbon atoms which can for example be fully saturated or contain one or more multiple carbon-carbon bonds, or be interrupted by other atoms such as oxygen or sulphur, or carry one or more substituent atoms or groups other than the alcoholic hydroxyl group. A substituent can be, for example, an alkyl group, particularly one having up to four carbon atoms, such as ethyl or propyl, a nitro group, a halogen atom, such as chlorine or bromine, a hydroxyl group, an alkoxy group having up to four carbon atoms, for example methoxy, ethoxy or butoxy, or a hydroxyalkoxy group having up to four carbon atoms, for example hydroxymethoxy or hydroxypropoxy.

Examples of such aliphatic alcohols that are monohydric include methanol, ethanol, n- and iso-propanol, n-, iso-, and s-butanol; amyl, hexyl, octyl, nonyl, decyl, dodecyl, hexadecyl and eicosyl alcohols; 3-buten-1-ol and 4-penten-2-ol; oleyl alcohol; 2-chloroethanol; 1-bromopropan-2-ol; ethylene glycol monobutyl ether, octadecamethylene glycol monopropyl ether; and diethylene glycol monoethyl ether.

Other useful aliphatic alcohols also include those having a cyclic structure, generally of from 5 to 7 carbon atoms, for example, cyclopentanol, cyclohexanol, cyclohex-3-en-1-ol; 2-ethylcyclohexanol, and 4-chlorocyclohexanol as well as aralkyl alcohols having for instance from 7 to 10 carbon atoms, for example benzyl alcohol, nuclear substituted benzyl alcohols, such as p-nitrobenzyl alcohol, and o-, m-, and p-vinyl benzyl alcohol.

Examples of alcohols that are polyhydric include dihydric alcohols, such as ethylene glycol, polyethylene glycols of the general formula $HO(CH_2CH_2O)_nCH_2CH_2OH$, where $n$ is for instance an integer from 1 to 10, propane-1,2-diol, propane-1,3-diol, butane-1,4-diol, 3-methylpentane-2,5-diol, neopentyl glycol, hexamethylene glycol and hexadecamethylene glycol; trihydric alcohols, for instance glycerol; tetrahydric alcohols, for instance erythritol and pentaerythritol; pentahydric alcohols, for instance arabinol; hexahydric alcohols, for instance mannitol and sorbitol; and carbohydrates, for instance glucose and sucrose.

Specific examples of the allyl aliphatic ethers that can be produced by the process of this invention include: allyl methyl ether; allyl n-butyl ether; allyl isohexyl ether; allyl n-dodecyl ether; crotyl isobutyl ether; 1,2-ethylene-bis-(1-methyl-2-butenyl)ether; 3-cyclohexylallyl cyclohexyl ether; 3-benzylallyl oleyl ether; p-nitrocinnamyl isooctyl ether; allyl 2-n-butoxyethyl ether; allyl 2-chloroethyl ether; 4-methoxybut-2-enyl benzyl ether; cyclohex-2-enyl s-butyl ether; etc. The foregoing examples are merely exemplary and are not intended to be limiting in any way with respect to the scope of this invention.

The cuprous salt catalyst that is employed in the process of the invention can, for example, be a cuprous halide such as the iodide, fluoride, chloride or bromide; cuprous sulphate; cuprous acetate or cuprous p-toluene sulphonate.

Specific examples of acid co-catalysts are as follows: inorganic acids such as, for example, hydrochloric, hydrobromic, hydrofluoric, sulphuric or phosphoric acid; Lewis acids, i.e., halides of elements in Group III of the Periodic Table, such as, for example, boron trifluoride, aluminum chloride, etc.; sulphonic acids such as, for example, sulphamic acid, benzenesulphonic acid, p-toluenesulphonic acid, etc.; and acidic ion-exchange resins such as, for example, a sulphonated styrene polymer or copolymer. The acidic ion-exchange resins are the preferred class of acid cocatalysts, and particularly good results have been obtained with sulphonated polystyrene resins containing from 1% to 15% by weight of divinylbenzene as a cross-linking agent.

The cuprous salt is usually added to the reaction mixture as the powdered solid, although it can in appropriate instances be formed in situ from copper powder or cuprous oxide or hydroxide and the acid which is employed as the co-catalyst. It is also possible to introduce the cuprous salt as a complex such as a halocuprous acid, or as an ion-exchange resin in which cuprous ions from a cuprous salt have displaced hydrogen ions originally present in an acidic ion exchange resin.

The acid co-catalyst can be added as a solid or liquid (in instances where these forms are appropriate). Often the co-catalyst can conveniently be in solution, for example, either aqueous or in one or both of the reactants when these are liquids. In solution in an aliphatic alcohol the acid will sometimes be present to some extent as an ester; thus a solution of sulphuric acid in ethanol will contain some ethyl hydrogen sulphate, and if desired the acid co-catalyst can be added in the form of a hydrolysable organic ester such as, for example, a sulphate. Boron trifluoride is most conveniently introduced as a complex such as, for example, the boron trifluoride-ethyl ether or the boron trifluoride-ethyl acetate complex.

The proportion of cuprous salt employed relative to the amount of the allyl ether can be as much as 0.5 mol. per mol. of allyl ether, but such large amounts are generally unnecessary since as little as 0.00001 mol. per mol. of allyl ether can be effective in some instances. Generally, a molar ratio of cuprous salt to allyl ether within the range 0.001:1 to 0.1:1 is preferred.

The ratio of acid co-catalyst to cuprous salt employed can vary over a wide range, that is from about 0.1 to about 50 equivalents of the acid per mol. of the cuprous salt. The preferred range of ratios is generally from about 0.2 to 10 equivalents of the acid per mol. of cuprous salt, and mixtures having a number of equivalents of acid within the range 0.4 to 7.5, for example 0.5, 1, 2, 3 and 5, per mol. of cuprous salt have been employed very successfully. When sulphuric acid is used as the co-catalyst better results are obtained if the cuprous salt is present in excess, that is if at least one mol. of cuprous salt is employed for each mol. of sulphuric acid. With this acid the preferred ratios are accordingly within the range 0.4 to 2 equivalents per mol. of couprous salt. A resin which can function as both catalyst and co-catalyst and in which there are for instance three equivalents of acid per mol. of cuprous salt, can be obtained by treating a resin containing a plurality of sulphonic acid groups with a quantity of a cuprous salt sufficiently to displace one quarter of the original number of hydrogen ions by cuprous ions.

The allyl ether and the aliphatic alcohol can be employed in stoichiometric amounts (that is 2 mols. of the alcohol per mol. of the ether) or either can be in excess relative to the other. Whether in any particular instance an excess of one reactant should be employed will usually be determined by such factors as their relative costs, the ease of isolation of the product in the presence of the unreacted excess of either of the reactants, and as explained in the following paragraph, the ability of a reactant to form an azeotrope with water. An excess, if employed, can be as little as 10% or as much as perhaps 50%, 100% or 200%.

In general, the process of the invention is carried out by heating the diallyl ether, the aliphatic alcohol, the cuprous salt and the acid co-catalyst under conditions where the continuous removal of water from the system is possible. This can conveniently be effected by arranging for the formation of an azeotrope of water with one or more of the components of the reaction system. In certain cases the component which forms the azeotrope will be a reactant or a product; n-butanol for example, which is used as a reactant in the production of allyl n-butyl ethers, and diallyl ether both form such azeotropes. If none of the reactants or products performs this function, then an inert component such as benzene or toluene can be added for the purpose. The reaction is usually carried out at the boiling point of the mixture and arrangements are made to condense the distillate and to collect it in a suitably constructed receptacle in which it can separate into an aqueous and an organic layer and from which the latter can be returned to the reaction mixture.

The time required to complete the reaction will depend on several factors including the reactivity of the diallyl ether and of the alcohol employed, and the proportions of the reactants, the cuprous salt and the acid co-catalyst. The course of a batch reaction can, however, be followed by observing the rate at which water is evolved, and when this becomes very slow, say less than 2% of the original rate, or when say 90% of the theoretical amount of water has been collected, the reaction can be terminated and the product isolated. In certain circumstances, for example, if the reaction is carried out continuously, it may be more expedient to terminate the reaction earlier and to separate and recycle unchanged starting materials.

Where the required product is an allyl ether which as well as containing an ethylenic group also contains a hydroxyl group, the starting materials are an allyl alcohol and a polyhydric alcohol, and the process is operated so that etherification of the polyhydric alcohol is incomplete. The etherification of the polyhydric alcohol with the allyl alcohol normally takes place in stages, and after the first hydroxyl group the reaction of a given hydroxyl group generally occurs considerably more slowly than the reaction of the preceding group. Frequently, this permits the selection of conditions, for example, in certain instances a moderately elevated reaction temperature of perhaps 60–90° C., where the reaction virtually ceases without any significant amount of a fully allylated product being formed, even in the presence of an excess of the allyl alcohol. In other instances, a partially allylated product can be obtained simply by stopping the reaction after the appropriate amount of by-product water has been produced, or for example by employing a deficiency of the allyl alcohol.

The complete etherification of a polyhydric alcohol with an allyl alcohol to give a polyether is practical, but this often calls for the use of more drastic conditions, including for example a relatively high reaction temperature of perhaps 100–150° C.

The reaction is generally terminated by removing the acid co-catalyst from the reaction system, conveniently by mechanical separation when the co-catalyst is an insoluble resin, by distillation when the acid forms a volatile ester, or in appropriate instances by neutralisation of the acid with a base. Fractional distillation of the reaction product, optionally after filtration to remove solid material, is generally a convenient procedure for the isolation of the required product. In general, of course, any appropriate method of isolation of the ether can be employed, and such a method need not necessarily entail distillation.

It is obvious that many variations may be made in the products and processes set forth above without departing from the spirit and scope of this invention.

What is claimed is:

1. A process for preparing allyl ethers which comprises contacting a diallyl ether with an aliphatic alcohol having from 1 to 6 hydroxyl groups in the presence of a cuprous salt and an acid co-catalyst; the cuprous salt being present in the proportion of from 0.00001 to 0.5 mol per mol of diallyl ether and the acid co-catalyst being present in the proportion of from 0.1 to 50 equivalents per mol of cuprous salt; wherein the acid co-catalyst is selected from the group consisting of hydrochloric acid, hydrofluoric acid, hydrobromic acid, sulphuric acid, phosphoric acid, boron trifluoride, aluminum chloride, sulphamic acid, benzenesulphonic acid, p-toluenesulphonic acid and sulphonated styrene ion-exchange resins; and wherein the cuprous salt is selected from the group consisting of cuprous halides, cuprous sulphate, cuprous acetate and cuprous p-toluene sulphonate.

2. A process for preparing allyl ethers containing free hydroxyl groups which comprises contacting a diallyl ether with an aliphatic alcohol having from 2 to 6 hydroxyl groups in the presence of a cuprous salt and an acid co-catalyst; the cuprous salt being present in the proportion of from 0.00001 to 0.5 mol per mol of diallyl ether and the acid co-catalyst being present in the proportion of from 0.1 to 50 equivalents per mol of cuprous salt such that etherification of the hydroxyl groups of the aliphatic alcohol is incomplete; wherein the acid co-catalyst is selected from the group consisting of hydrochloric acid, hydrofluoric acid, hydrobromic acid, sulphuric acid, phosphoric acid, boron trifluoride, aluminum chloride, sulphamic acid, benzene sulphonic acid, p-toluenesulphonic acid and sulphonated styrene ion-exchange resins; and wherein the cuprous salt is selected from the group consisting of cuprous halides; cuprous sulphate, cuprous acetate and cuprous p-toluene sulphonate.

3. A process for preparing allyl ethers which comprises contacting diallyl ether with an aliphatic alcohol having from 1 to 6 hydroxyl groups in the presence of cuprous chloride and an acidic sulphonated polystyrene resin containing from 1 to 15% by weight of divinylbenzene as a cross-linking agent, the cuprous chloride being present in the proportion of from 0.00001 to 0.5 mol per mol of diallyl ether and the sulphonated polystyrene resin being present in the proportion of from 0.1 to 50 equivalents per mol of cuprous chloride.

4. A process for preparing allyl ethers containing free hydroxyl groups which comprises contacting diallyl ether with an aliphatic alcohol having from 2 to 6 hydroxyl groups in the presence of cuprous chloride and an acidic sulphonated polystyrene resin containing from 1–15% by weight of divinylbenzene as a cross-linking agent, the cuprous chloride being present in the proportion of from 0.00001 to 0.5 mol per mol of diallyl ether and the sulphonated polystyrene resin being present in the proportion of from 0.1 to 50 equivalents per mol of cuprous chloride such that etherification of the hydroxyl groups of the aliphatic alcohol is incomplete.

References Cited by the Examiner

UNITED STATES PATENTS 2,847,477   8/1958   Watanabe et al. ____ 260—614 X
2,847,478   8/1958   Hwa et al. _____ 260—614 X

OTHER REFERENCES

Watanabe et al., Jour. of Org. Chem., Vol. 23 (1958), pages 1666–1668.

LEON ZITVER, *Primary Examiner.*

CHARLES B. PARKER, *Examiner.*

B. HELFIN, H. T. MARS, *Assistant Examiners.*